United States Patent [19]
Verona

[11] Patent Number: 4,647,783
[45] Date of Patent: Mar. 3, 1987

[54] MEASUREMENT OF TEMPORAL RESPONSE OF ELECTRO-OPTICAL SYSTEMS

[75] Inventor: Robert W. Verona, Silver Springs, Md.

[73] Assignee: The United States of America as represented by the Secretary of the Army, Washington, D.C.

[21] Appl. No.: 730,015

[22] Filed: May 3, 1985

[51] Int. Cl.$^4$ .................. G01J 5/48; G01M 11/02
[52] U.S. Cl. .................. 250/495.1; 250/330; 250/493.1; 250/252.1
[58] Field of Search ............ 250/504 R, 495.1, 494.1, 250/493.1, 252.1, 330; 374/1, 2

[56] References Cited

U.S. PATENT DOCUMENTS 3,986,384 10/1976 Giorgi ........................ 374/2
4,260,160 4/1981 Ejnell et al. ................ 273/408
4,263,515 4/1981 Runciman ................ 250/494.1

Primary Examiner—Carolyn E. Fields
Assistant Examiner—Constantine Hannaher
Attorney, Agent, or Firm—Max L. Harwell; John E. Holford; Anthony T. Lane

[57] ABSTRACT

An improved test system is provided for infrared imaging devices, such as the Army's FLIR (Forward Looking Infra-Red) device. The system employs a moving belt made from one of the complementary portions of a hook-and-loop fabric that fastens to itself, such as a nylon product sold under the trademark "VELCRO". Strips of the other portion of the same fabric are bonded to target members of a variety of shapes, sizes and compositions, which are mounted on the belt and heated to various programmed temperatures as the belt is moved. Test results are recorded with a TV type camera and associated electronic computer type equipment from the screen of the imaging device.

9 Claims, 2 Drawing Figures

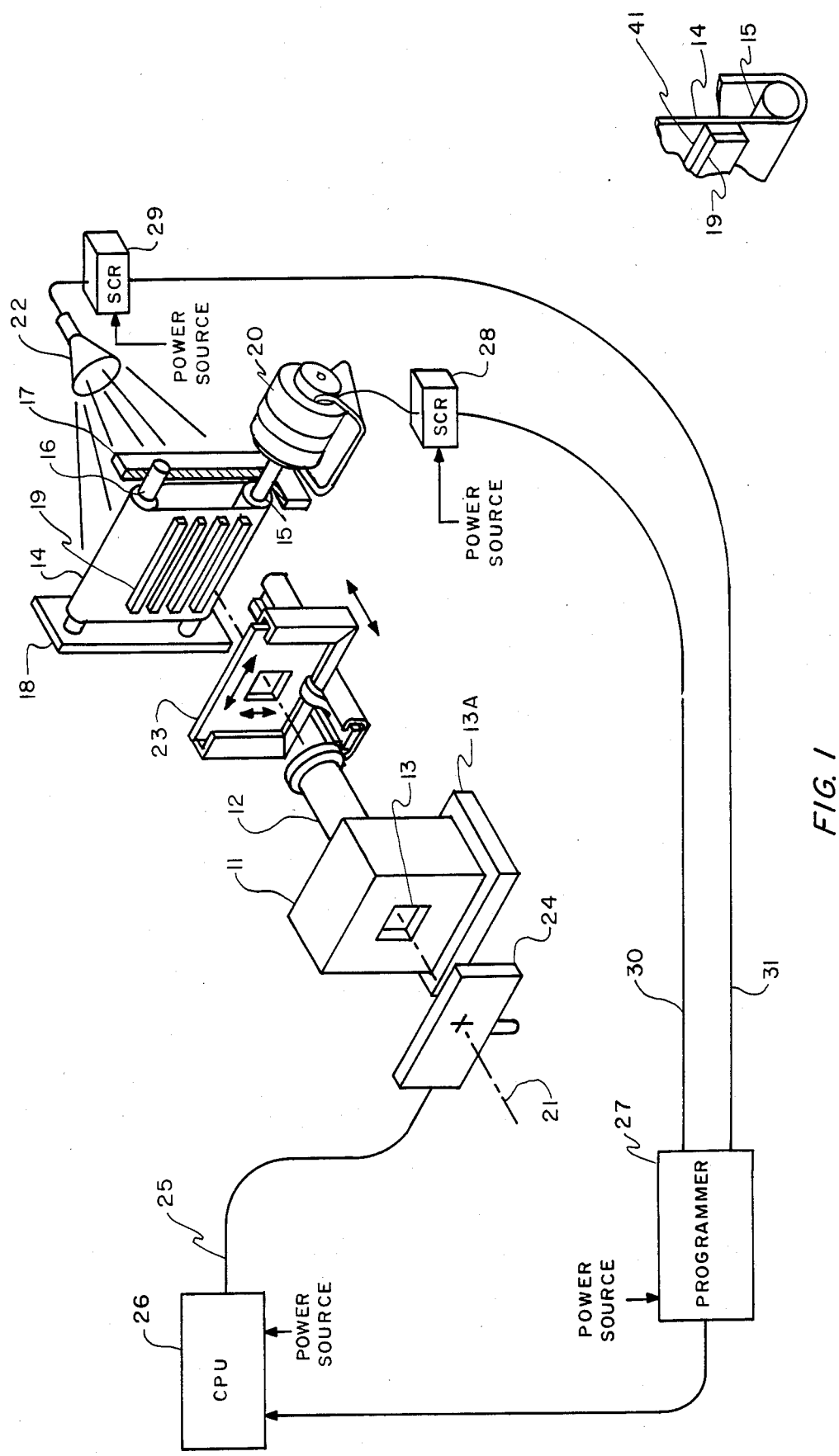

MEASUREMENT OF TEMPORAL RESPONSE OF ELECTRO-OPTICAL SYSTEMS

The invention described herein may be manufactured, used, and licensed by the U.S. Government for governmental purposes without the payment of any royalties thereon.

BACKGROUND OF THE INVENTION

1. Field of the Invention

The invention relates to infrared imaging devices and more particularly to a dynamic test system to evaluate their overall performance. The invention is particularly concerned with far-infrared imagers such as the military FLIR device.

2. Description of the Prior Art

The basic element of these devices is a semiconductor photodiode usually made from mercury-cadmium-telluride. These can be made with one diode by using two mirrors to scan the image over the diode, with a line array of diodes and one scanning mirror or better with a two dimensional staring diode array in which every part of the image is being processed at the same time.

Each device has its own unique problems. The single diode is highly dependent on the time response of the diodes. The device using a two dimensional array is highly dependent on the relative responses of the various diodes. The device using the one dimensional array is dependent on both of the above.

A popular test system for these devices includes a thin flat rotating disk separated into angular domains defined by coatings extending between two boundary radii. The coatings alternate between being more or less absorptive and reflective. During the test the disk is rotated at various angular velocities and illuminated with a variable power infrared or far-infrared source. The imaging device is placed to view the disk normally and the relative position of the disk to the device is translated in two directions orthogonal to the disk axis. The resulting electrical signal responses produced by each diode, after amplification and filtering by the device, are then recorded separately. One shortcoming of this type of test is that there is no check of the exit optics or screen unit which is often an integral part of the imaging device. A further shortcoming is the complexity of test data which evolves. When a point in the object space of the imager is near the center of the disc the input varies more rapidly than a similar point near the edge of the disk. As the disk is moved these conditions vary so that a rather complex set of output signals ensue. This places added demands on the computer memory.

SUMMARY OF THE INVENTION

The present invention provides an improvement over the above described system by substituting a belt type drive in place of the spinning disk and by recording the output from the viewing screen. In addition the absorbing and reflecting segments are made completely interchangeable in size, shape and composition.

BRIEF DESCRIPTION OF DRAWINGS

FIG. 1 shows a complete test system according to the present invention; and

FIG. 2 shows an enlarged view of the belt structure from FIG. 1.

DESCRIPTION OF THE PREFERRED EMBODIMENTS

Referring to FIG. 1 there is shown a complete test system according to the invention with an infrared or thermal imager. The thermal imager 11 rests in a test holder receiving an image through the input optics 12. This image is detected by an array of photodiodes inside the imager, amplified and filtered by image processing circuitry within the imager housing. In most systems the image is recreated in real time on a screen 13, e.g. a CRT tube either physically mounted on the imager as shown or located a short distance therefrom and connected thereto by means of a video cable. The latter might be the case in a tank or aircraft where the imager is externally mounted and the screen mounted on the instrument panel inside.

To provide a test input image for such a system a continuous belt 14 is mounted vertically between a pair of spaced parallel rollers 15 and 16 which are in turn mounted between supports 17 and 18. Carried by the belt are a series of bar shaped target members 19 preferably of uniform cross section. The bars preferably have equal lengths and are mounted parallel to the rollers. One or both of the rollers is connected to a variable speed electric motor 20 to move the belt around and between the rollers. One external broad flat surface of the belt is centered normal to the optical axis 21 of the imager. The opposite external broad surface of the belt is illuminated by an infrared lamp 22 to maintain the bars at any preselected test temperature up to 75° C. The bars have a sufficiently large cross-sectional area to maintain a substantially constant total heat content and thereby exhibit a substantially constant temperature when not being heated. To control the field of view a small aperture plate 23 can be inserted between the belt and the imager. The plate aperture should be substantially the same size as the input aperture of the imager 11. The largest dimension of the bars should then be x times the plate aperture width, where x is the number of detectors or pixels in a horizontal picture line of the imager. The width of the bars should be substantially equal to the height of the plate aperture. The plate is preferably mounted for three degrees of translation so that any or all areas of the image created by the target bars can be presented to the imager. With a fixed plate the image can be reduced by the aperature plate to barely cover all of the detectors or the aperture can block the image from the edge detectors to provide a cool reference frame around the image during the test procedure.

The output data is taken from the viewing screen by means of a TV type camera, 24, e.g. a type which employs a Charge Coupled Detector or Device (CCD). Power for the detector and data therefrom is passed by cable 25 to a central processor (CPU) 25 or other recording equipment. Light amplitude data is stored with the x and y screen position and time.

Timing is controlled by a programmer or the programmer can be controlled by the CPU, if the latter has the proper internal clock with external access. The programmer in turn controls SCR elements 28 and 29 or the like with low power signals through cables 30 and 31 to vary the speed of the motor and the intensity of the heat lamps in accordance with a preprogrammed test plan. The particular structure of the motor control, lamp control, CCD array PROGRAMMER and/or CPU is not pertinent to the present invention, numerous arrangements of these circuits are available in the prior art. These devices can obviously also be controlled manually instead of being preprogrammed or as a manual override function in the programmer of CPU. It is probably best to mount the CPU, programmer and CCD detector on an output optical platform in a first housing (not shown) and the remaining elements on an input optical platform in a second housing (also not shown). These housings may be fitted with adaptors, if desired, to mount them to or near the screen and FLIR camera for quick field tests.

FIG. 2 shows a more detailed view of the belt structure. The belt 14 is preferably made of one of the complementary portions of a hook-and-loop fabric such as that sold under the commonly known trademark of "VELCRO." A strip 41 of the other portion of the same fabric is glued to one broad surface of each of the bar shaped target elements. Thus the bar can easily be interchanged to simulate different types of targets. Not only can the bars be different materials, but they can simulate the same materials with different surface finishes, coatings, and/or surface contours, such as cylindrical cross-sections, triangular cross-sections, etc. The overall size of the target elements, heat lamp, motor, etc. depends on their spacing from the unit under test. A small size is desirable to conserve energy and material, but this must be compatible with the entrance optics of the unit and the ability of the operator to manipulate the target bars and aperture plate 23.

I claim:

1. An apparatus for performing a test on a thermal imager or the like, including:
   an input optical platform having an optical test axis and including;
   holding means attached to said platform to mount said imager with its optical axis coincident with said test axis,
   a pair of spaced parallel rollers mounted on said platform and linked by a belt having two external flat surface positions;
   a motor coupled to one of said rollers to drive both said rollers and said belt;
   an aperture plate mounted on said platform normal to and centered on said test axis between said holding means and said belt;
   a series of bar shaped elements of equal length having different thermal properties mounted on said belt parallel to said rollers, and a radiant heating means mounted on said platform adjacent said belt on the opposite side thereof from said aperture plate to maintain the temperature of said bars at a level greater than ambient temperature.

2. The apparatus according to claim 1, wherein:
said motor includes a control means to vary the speed of said motor in response to a low power control signal.

3. The apparatus according to claim 1, wherein:
said heating means includes a control means to vary the temperature of said bar shaped elements in response to a low power control signal.

4. The apparatus according to claim 1, wherein:
the ratio of the length of said bar shaped member to the width of said aperture equals the number of pixels in a horizontal line of said imager.

5. The apparatus according to claim 1, wherein:
said aperture plate is mounted only for translation of the aperture therein in the direction of said test axis and directions orthogonal thereto for the full distance between said belt and said holding means and orthogonally a distance equal to the dimensions of said flat portions of said belt.

6. The apparatus according to claim 5, wherein:
said aperture is dimensioned to pass an image of said bars which substantially equals in length a complete image line of said imager with the aperture plate is positioned at its closest approach to said holding means.

7. The apparatus according to claim 1, further including:
an output optical platform comprising;
a TV type camera means to view the ouput screen of said imager; and
a central processor means coupled to said camera means to store the output image therefrom.

8. The apparatus according to claim 7, further including:
a programmer means mounted on said output platform and coupled to said central processing means, said motor and said heating means to control and record the output responses of said camera by varying the velocity and temperature of said bar elements.

9. The apparatus according to claim 1, wherein:
said belt is made of one of the complementary portions of a hook-and-loop fabric; and
said bars include a layer of the other of said complementary portions of said hook-and-loop fabric which engages the fabric portion of said belt, such that said bars are easily positioned on and removed from said belt.

* * * * *